Figure 1:
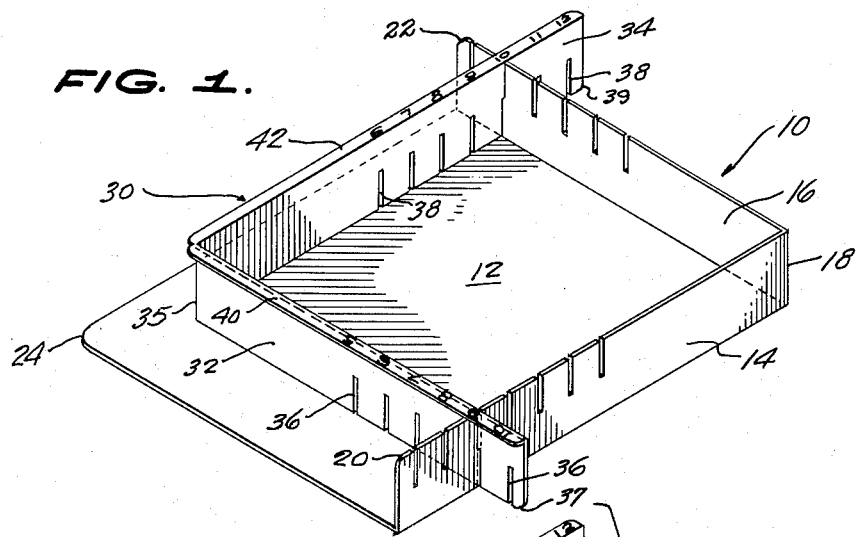

Nov. 5, 1963

V. J. NICOLI 3,109,361

ADJUSTABLE PAN

Filed Nov. 8, 1960

INVENTOR.
VINCENT J. NICOLI,
BY
McMorrow, Berman & Davidson
ATTORNEYS

3,109,361
ADJUSTABLE PAN
Vincent J. Nicoli, 13 Magoni Terrace, Plymouth, Mass.
Filed Nov. 8, 1960, Ser. No. 68,129
2 Claims. (Cl. 99—435)

This invention relates to culinary containers, and, in particular, to a pan adapted for baking, molding, or other food processing.

It is an object of the invention to provide such a container which is adjustable as to volume, by variation of the lateral dimensions. A further object is to provide such an adjustable pan having only two component pieces, each integral throughout. Other objects are to effect easy removal of a cake or other food product from the pan and also to permit removal of cut pieces without digging, and resultant crumbling. A further object is to assist in maintaining freshness in a cake or other product during a period of consumption, and another object is to facilitate the use of foil wrappings, as in transfer to freezer storage, for instance.

These and other objects, which will be apparent to those skilled in the art, are attained by the present invention, which may be briefly described as comprising a bottom plate with integral upright walls consisting of a side and end meeting in a right-angled corner, and each having a series of slots in its upper edge, and a removable piece consisting of a side wall and an end wall disposed at a right angle and having slots in their lower edges, the slots in the respective components being adapted to interengage in various combinations leading to a variety of length-width ratios in the effective volume of the pan.

Figure 2:
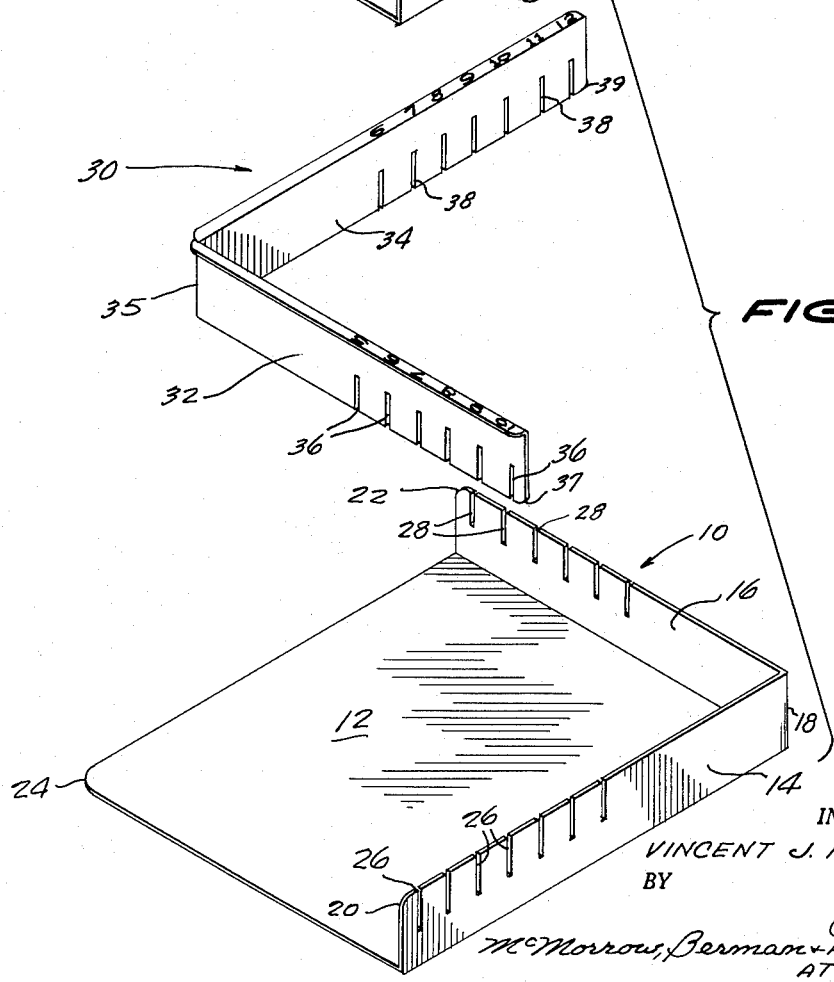

For a more detailed description of the invention, reference is made to the following specification, as illustrated in the drawing, in which:

FIGURE 1 is a view, in perspective, of the two separable parts of the pan, as assembled in one combination of the coupling slots, and FIGURE 2 is an exploded view of the parts of FIGURE 1, when separated.

Referring to the drawings by characters of reference, there is shown a two-part pan with a base component 10 comprising a flat, bottom plate 12 of generally rectangular configuration, having integral, upright walls 14, 16 rising from two of its adjacent sides, meeting in a corner edge 18. Sharp corners are avoided by rounding the upright walls as at 20, 22, and the bottom plate as at 24.

Commencing near the end remote from corner 18, the wall 14 has a series of vertical slots 26, open at the top of the wall, extending half-way down the wall, and evenly spaced along the wall to a point generally medially thereof. Wall 16 also has a series of slots 28 which are similarly disposed.

The removable component, indicated generally by the numeral 30, consists of a pair of integral wall members 32, 34, meeting in a right-angled corner 35 and of a height equal to that of walls 14, 16, with a series of slots 36 in wall 32, and a series of slots 38 in wall 34, similar to slots 26 and 28 except that they are located in the lower half of the wall, and open downwardly. The corners of the plates are also rounded, as at 37, 39. It will be seen that as the parts are brought together from the position shown in FIGURE 2, which, in practice will be by lowering part 30, one of the slots 36 will be superimposed on one of the slots 26, and one of the slots 38 will be superimposed on one of the slots 28. Continued lowering of the part 30 brings the bottoms of slots 36 and 38 into engagement with the bottoms of slots 26, 28, with a result as shown in FIGURE 1 wherein the two pairs of walls bear the relationship of intersecting planes and their top and bottom edges are co-planar.

As shown, the slots in opposite walls 16, 32 are six in number, and the slots in opposite walls 14, 34 are seven in number. Thus, since any one of a series of six slots may mate with any one of a series of seven slots, the possible combinations of sets of pan dimensions are forty-two in number. Of course, the series of slots could be extended along the entire length of each wall, but the embodiment illustrated recognizes that there will be a practical lower limit on the size of pan desired.

Removable piece 30 does not have the stability of the three-sided piece 10, but it is reinforced against bending by virtue of flanges 40, 42 at the top edges of the respective walls 32, 34, formed by outward bending of the wall material. These flanges also serve as a lifting edge engageable by the fingers of the user, and in addition, serve to carry indicia, such as the numerals shown in the drawing to indicate the effective wall length at each slot position. For instance, an 8 x 10 size, is easily determined by spotting a slot under the number 8 over one of the walls of the base and moving this slot along the said wall until the slot under number 10 in the other wall is over the other wall of the base. Piece 30 is then lowered into position.

The pan of this invention has a great variety of uses. It can be used for roasting meat, in large or small pieces, or in multiple, especially when lined with metal foil, and is ideal for making meat loaves from available meat supplies. It can be used as a cookie sheet, and for baking cakes, bars, and deep dish square pies. When the pan is set up for small size, the extended portions of the bottom may be employed to advantage for other items, such as the baking of potatoes along with a meat dish. The pan may also be used as a gelatin mold, especially when a metal foil lining is used, and the gelatin may be slid off the pan after removal of the removable sides. This eliminates the need for dipping the mold in hot water, as is customary. Breaking up of the gelatin mass is also avoided. Another use is the molding into uniform packages of food destined for the freezer. After a cake has been baked, access for cutting into pieces is easily had by removing the removable portion, which obviates digging and resultant crumbling. In addition, as a cake is gradually used up the part 30 may be readjusted from time to time to keep it closely adjacent the cake, and thus help to preserve freshness. The slots in the walls, in addition to their main purpose, facilitate circulation of heat waves with even flow and more uniform browning.

While a certain preferred embodiment has been shown and described, other modifications will be apparent to those skilled in the art, in the light of this disclosure, and the invention should not, therefore, be deemed as limited except as shall appear from the spirit and scope of the appended claims.

I claim:

1. An adjustable culinary container comprising a base member having a rectangular, flat bottom plate with integral, rectangularly disposed, vertical walls on two adjacent sides meeting in an upright corner edge, said walls each having a series of vertical slots in its upper edge, extending half of the vertical dimension of the wall, and arranged in spaced relation from the free end of the wall toward the said corner edge, and a removable member comprising a pair of rectangular plates disposed at 90° about a corner edge, and having a width substantially the same as that of the vertical walls in the base member, said plates having slots disposed similarly to the slots in the walls of the base member with respect to the corner edge and free ends, but located in the lower edge of the plates, a rectangularly disposed flange extending outwardly of the upper edge of each of said plates for reinforcing said plates of the removable member and adapted to carry indicia thereon, said member being disposed so that its rectangular plates intersect the vertical walls of said base member with a selected slot in each of the plates interengaging selected slots in the vertical walls, and with the bottom edges of said rectangular plates resting on the bottom plate of the base member to thereby form a four-sided enclosure of a selected size.

2. An adjustable culinary container comprising a base member having a rectangular, flat bottom plate with integral, rectangularly disposed, vertical walls on two adjacent sides meeting in an upright corner edge, said walls each having a series of vertical slots in its upper edge, extending half of the vertical dimension of the wall, and a removable member comprising a pair of rectangular plates disposed at 90° about a corner edge, and having a width substantially the same as that of the vertical walls in the base member, said plates having slots disposed similarly to the slots in the walls of the base member with respect to the corner edge and free ends, but located in the lower edge of the plates, and a rectangularly disposed flange extending outwardly of the upper edge of each of said plates for reinforcing said plates of the removable member and adapted to carry indicia thereon, said member being disposed so that its rectangular plates intersect the vertical walls of said base member with a selected slot in each of the plates interengaging selected slots in the vertical walls, and with the bottom edges of said rectangular plate resting on the bottom plate of the base member to thereby form a four-sided enclosure of a selected size.

References Cited in the file of this patent

UNITED STATES PATENTS

| | | |
|---|---|---|
| 121,496 | Derrick | Dec. 5, 1871 |
| 597,188 | Nance | Jan. 11, 1898 |
| 1,208,867 | Weitzel | Dec. 19, 1916 |
| 2,098,929 | Barnes | Nov. 9, 1937 |
| 2,340,369 | Downer | Mar. 27, 1943 |
| 2,632,938 | Kopf | Mar. 31, 1953 |
| 2,891,466 | Foster | June 23, 1959 |
| 2,891,590 | Olson | June 23, 1959 |